(12) United States Patent
Wree et al.

(10) Patent No.: US 8,126,338 B2
(45) Date of Patent: Feb. 28, 2012

(54) METHOD AND APPARATUS FOR REPEATERLESS HIGH-SPEED OPTICAL TRANSMISSION OVER SINGLE-MODE FIBER USING COHERENT RECEIVER AND ELECTRONIC DISPERSION COMPENSATION

(75) Inventors: Christoph T. Wree, Ewing, NJ (US); Suhas P. Bhandare, Levittown, PA (US); Donald A. Becker, Edison, NJ (US); Daniel R. Mohr, Allentown, NJ (US); Abhay M. Joshi, New Hope, PA (US)

(73) Assignee: Discovery Semiconductors, Inc., Ewing, NJ (US)

( * ) Notice: Subject to any disclaimer, the term of this patent is extended or adjusted under 35 U.S.C. 154(b) by 696 days.

(21) Appl. No.: 12/290,250

(22) Filed: Oct. 29, 2008

(65) Prior Publication Data

US 2009/0142069 A1 Jun. 4, 2009

Related U.S. Application Data

(60) Provisional application No. 61/002,263, filed on Nov. 7, 2007.

(51) Int. Cl.
*H04B 10/06* (2006.01)
(52) U.S. Cl. ............................ 398/208; 398/204
(58) Field of Classification Search ............ 398/204, 398/208
See application file for complete search history.

(56) References Cited

U.S. PATENT DOCUMENTS

| | | | | |
|---|---|---|---|---|
| 4,596,052 A | | 6/1986 | Wright et al. | 398/204 |
| 4,718,121 A | | 1/1988 | Epworth | 398/203 |
| 4,912,527 A | * | 3/1990 | Yamazaki | 398/204 |
| 5,434,889 A | * | 7/1995 | Baier | 375/344 |
| 5,757,531 A | * | 5/1998 | Tomesen et al. | 398/204 |
| 6,781,679 B1 | | 8/2004 | Richards et al. | 356/73.1 |
| 7,122,129 B2 | | 10/2006 | Yagi et al. | 252/301.4 F |
| 7,340,183 B2 | * | 3/2008 | Price et al. | 398/187 |
| 7,369,619 B1 | * | 5/2008 | Hsu et al. | 375/259 |
| 7,421,012 B1 | * | 9/2008 | Feng et al. | 375/148 |
| 7,522,841 B2 | * | 4/2009 | Bontu et al. | 398/154 |
| 2002/0034191 A1 | | 3/2002 | Shattil | 370/464 |
| 2003/0058504 A1 | | 3/2003 | Cho et al. | 359/161 |
| 2003/0118086 A1 | * | 6/2003 | Pietila et al. | 375/150 |
| 2004/0091025 A1 | * | 5/2004 | Sindhushayana et al. | 375/148 |
| 2005/0117915 A1 | * | 6/2005 | Miyazaki | 398/188 |
| 2007/0071456 A1 | | 3/2007 | Chen et al. | 398/204 |
| 2007/0154221 A1 | * | 7/2007 | Mcnicol et al. | 398/135 |
| 2007/0223932 A1 | | 9/2007 | Hsieh | 398/152 |
| 2009/0286473 A1 | * | 11/2009 | Park et al. | 455/16 |
| 2010/0266291 A1 | * | 10/2010 | Boffi et al. | 398/159 |

OTHER PUBLICATIONS

Katsushi Iwashita, Chromatic Dispersion Compensation in Coherent Optical Communications, Mar. 1990, Journal of Lightwave Technology vol. 8, pp. 367-375.*

(Continued)

*Primary Examiner* — Nathan Curs
(74) *Attorney, Agent, or Firm* — Watov & Kipnes, P.C.; Kenneth Watov

(57) ABSTRACT

Repeaterless transmission of differential phase-shift keying (DPSK) at 10.7 Gb/s over at least 304 km of standard single-mode fiber is obtained through use of a coherent optical receiver including electronic dispersion compensation. High receiver sensitivity and high tolerance to nonlinearities of DPSK, allow overcoming a total link loss of 58 dB with a 3 dB system margin, through use in the receiver of heterodyne detection to preserve phase distortions resulting from chromatic dispersion, to permit electronic dispersion compensation to be used.

21 Claims, 5 Drawing Sheets

OTHER PUBLICATIONS

Keang-Po Ho, Phase-Modulated Optical Communications Systems, 2005, Springer, pp. 7-10, 53-55, 61-67, 69-71, 76-78, 132.*

N. Tranvouez, E. Brandon, M. Fullenbaum, P. Bousselet, I. Brylski; "Unrepeatered Systems: State of the Art Capability"; in Proc. SubOptic Conference; May 2007; Paper We2.19, pp. 1-5.

S. Chandrasekhar, C. R. Doerr, L. L. Buhl, Y. Matsui, D. Mahgerefteh, X. Zheng, K. McCallion, Z. Fan, and P. Tayebati; "Repeaterless Transmission With Negative Penalty Over 285 km at 10 Gb/s Using a Chirp Managed Laser"; IEEE Photonics Technology Letters, vol. 17, No. 11; Nov. 2005 pp. 2454-2456.

C. Wree, D. Becker, D. Mohr, A. Joshi; "Coherent Receivers for Phase-Shift Keyed Transmission"; in Proc. Optical Fiber Communications Conf. (OFC 2007); Mar. 2007; paper OMP6; 4 pages.

A. H. Gnauck, J. Sinsky, P. J. Winzer, and S. Chandrasekhar; "Linear Microwave-Domain Dispersion Compensation of 10 Gb/s Signals Using Heterodyne Detection"; in Proc. Optical Fiber Communications Conf. (OFC 2005); Mar. 2005; Postdeadline paper PDP31; 3 pages.

T. Mizuochi; "Forward Error Correction in Optical Communication Systems"; in Proc. Europ. Conference on Optical Communications (ECOC), Berlin, Germany; Sep. 17, 2007, Tutorial Mo.2.2; 23 pages.

A. Joshi, X. Wang, D. Mohr, D. Becker, and C. Wree; "Balanced Photoreceivers for Analog and Digital Fiber Optic Communications," Proc. of SPIE, vol. 5814; Mar. 2005; pp. 39-50.

C. Wree, D. Becker, D. Mohr, A. Joshi; "Measured Noise Performance for Heterodyne Detection of 10-Gb/s OOK and DPSK": IEEE Photonics Technology Letters, vol. 19; Jan. 2007; pp. 15-17.

K. Iwashita, N. Takachio; "Chromatic Dispersion Compensation in Coherent Optical Communications"; IEEE Journal of Lightwave Technology, vol. 8, No. 3; Mar. 1990; pp. 367-375.

N. Bergano; "Wavelength Division Multiplexing in Long-Haul Transoceanic Transmission Systems"; IEEE Journal of Lightwave Technology, vol. 23, No. 12; Dec. 2005; pp. 4125-4139.

C. Wree, D. Becker, D. Mohr, and A. Joshi; "Optical Coherent Receivers for 2.5 and 5Gb/s"; Paper presented at the 18th Annual Meeting of the IEEE Lasers & Electro-Optics Society, Sydney, Australia; Oct. 23-27, 2005, paper WMI ; pp. 1-2.

C. Wree, N. Hecker-Denschlag, E. Gottwald, P. Krummrich, J. Leibrich, E. Schmidt, B. Lankl, W. Rosenkranz; "High Spectral Efficiency 16.-b/s/Hz Transmission (8×40 Gb/s With a 25-GHz Grid) Over 200-km SSMF Using RZ-DQPSK and Polarization Multiplexing"; IEEE Photonics Technology Letters, vol. 15, No. 9; Sep. 2003; pp. 1303-1305.

H. Sun, K.T. Wu, K. Roberts; "Real-Time Measurement of a 40 Gb/s Coherent System"; Optics Express, vol. 16, No. 2; Jan. 21, 2008; pp. 873-879.

* cited by examiner

METHOD AND APPARATUS FOR REPEATERLESS HIGH-SPEED OPTICAL TRANSMISSION OVER SINGLE-MODE FIBER USING COHERENT RECEIVER AND ELECTRONIC DISPERSION COMPENSATION

RELATED APPLICATION

This application is related to and takes priority from Provisional Application No. 61/002,263, filed on Nov. 7, 2007, and is related to Becker et al. U.S. Pat. No. 7,406,269, issued on Jul. 29, 2008, the teachings of each of which are incorporated by reference herein to the extent they do not conflict herewith. The related Provisional Application has the same inventorship and assignee as the present application. The related Becker et al. U.S. Pat. No. 7,406,269 has the same assignee as the present application.

FIELD OF THE INVENTION

The present invention relates to signal transmission systems and methods of implementing the same, and more particularly to a repeaterless 10.7 Gb/s non-return-to-zero (NRZ) differential phase-shift keying (DPSK) transmission.

BACKGROUND OF THE INVENTION

Repeaterless transmission enables less complex systems not only for submarine but also for terrestrial fiber optical communications. The fiber loss, fiber nonlinearities, and chromatic dispersion (CD) of the widely deployed standard single-mode fiber (SSMF) are the biggest hurdles to design and implement long-haul repeaterless terrestrial transmission systems operating at about 1550 nm. Previously, a record repeaterless transmission distance of 285 km over SSMF was reported using a chirped managed laser with low extinction ratio. However, this required careful selection of the combination of an appropriate dispersion compensating fiber, a switchable optical dispersion compensator, and electronic dispersion compensation. The present inventors recognized that the use of dispersion compensating fibers, and switchable optical dispersion compensators limit the repeaterless transmission distance of known fiber-optic communication systems.

SUMMARY OF THE INVENTION

An object of the invention is to provide an improved repeaterless DPSK transmission system.

The present invention relates generally to a repeaterless 10.7 Gb/s non-return-to-zero (NRZ) differential phase-shift keying (DPSK) transmission system and method of implementing the same. Our inventive system provides repeaterless transmission of 10.7 Gb/s differential phase-shift keying (DPSK) over 304 km of SSMF, which is a record to the best of our information and knowledge. This is achieved by using DPSK in combination with coherent detection and electronic dispersion compensation. DPSK provides high sensitivity and allows high fiber launch power to overcome link losses of up to 60 dB. No in-line amplifiers, remotely pumped Erbium doped fiber amplifiers (EDFAs), or Raman amplifiers are necessary. The heterodyne receiver used in our experiments both preserves the optical phase distortions due to chromatic dispersion, and enables linear microwave dispersion compensation in the electrical domain. Such a compensation scheme eliminates any additional link loss associated with the use of in-line optical dispersion compensating modules (DCM). At a transmission distance of over 304 km of SSMF, we confirmed that our system has a margin of 3 dB considering the most simple Reed-Solomon forward error correction (FEC) code RS(255,239) which requires a minimum bit error rate (BER) of 1.8e-4 (Q-factor of 11 dB).

In one aspect of the present invention, there is provided a repeaterless 10.7 Gb/s non-return-to-zero (NRZ) differential phase-shift keying (DPSK) transmission system, comprising:
a coherent optical receiver receptive of a laser input signal;
means for providing electronic dispersion compensation; and
heterodyne detection means connected between an output of said receiver and an input to said dispersion compensation means, said detection means providing preservation of the phase distortions arising from chromatic dispersion to permit use of said electronic dispersion compensation.

BRIEF DESCRIPTION OF THE DRAWINGS

Various embodiments of the present invention are described with reference to the drawings, in which like items are identified by the same reference designations, wherein.

DETAILED DESCRIPTION OF THE INVENTION

Figure 1:
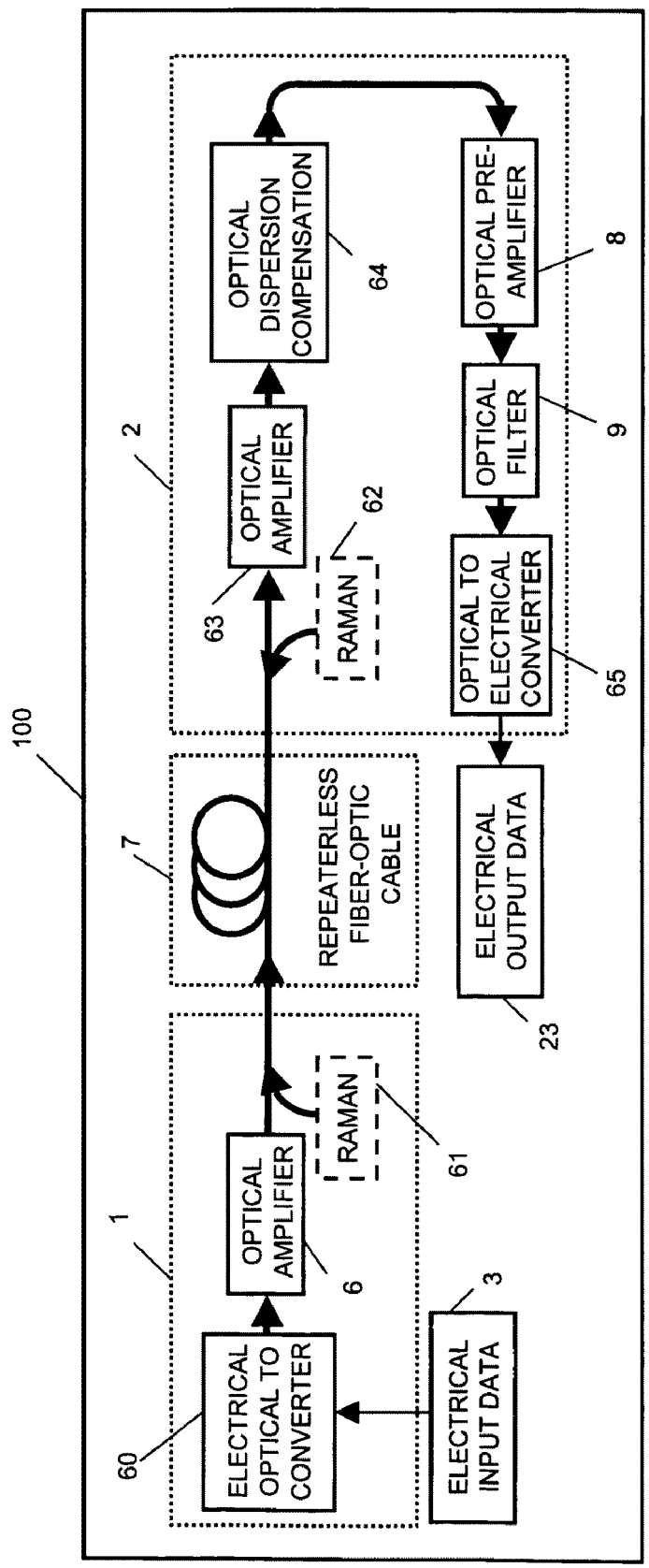
FIG. 1 shows a block-schematic diagram of a known repeaterless optical transmission system.

A known repeaterless optical transmission system is shown in the block schematic diagram of FIG. 1. As shown, the prior system 100 provides an optical transmitter 1 including an electrical-to-optical converter 60 for converting an electrical input data 3 into an optical signal, which in turn is fed to a lumped optical amplifier 6. Optionally, a distributed Raman amplification process 61 is used after the lumped optical amplifier 6 before the optical signal is inputted into one end of a repeaterless fiber-optic cable or span 7. An optical receiver 2 receives the optical signal from the output, or other end of the repeaterless fiber-optic span 7. Receiver 2 optionally feeds the optical signal to a distributed Raman amplification process 62, the output of which is connected to an optical amplifier 63 to compensate for the loss of the repeaterless fiber-optic cable or fiber-optic span 7. If the Raman application process is not used, the optical signal is connected directly to the input of optical amplifier 63. The output of the optical amplifier 63 is coupled to an optical dispersion compensating module 64 to equalize the effect of chromatic dispersion caused by the repeaterless fiber-optic span 7. At the output of the optical dispersion compensation module 63 the signal is amplified with an optical preamplifier 8 to overcome the loss of the optical dispersion compensating module 63. The output of which serves as an input to the optical filter 9 which rejects the unwanted noise from the optical amplifiers 6, 63, and 8. The signal is then converted into the electrical domain with the optical-to-electrical converter or receiver 65 to output the electrical output data 23.

Figure 2:
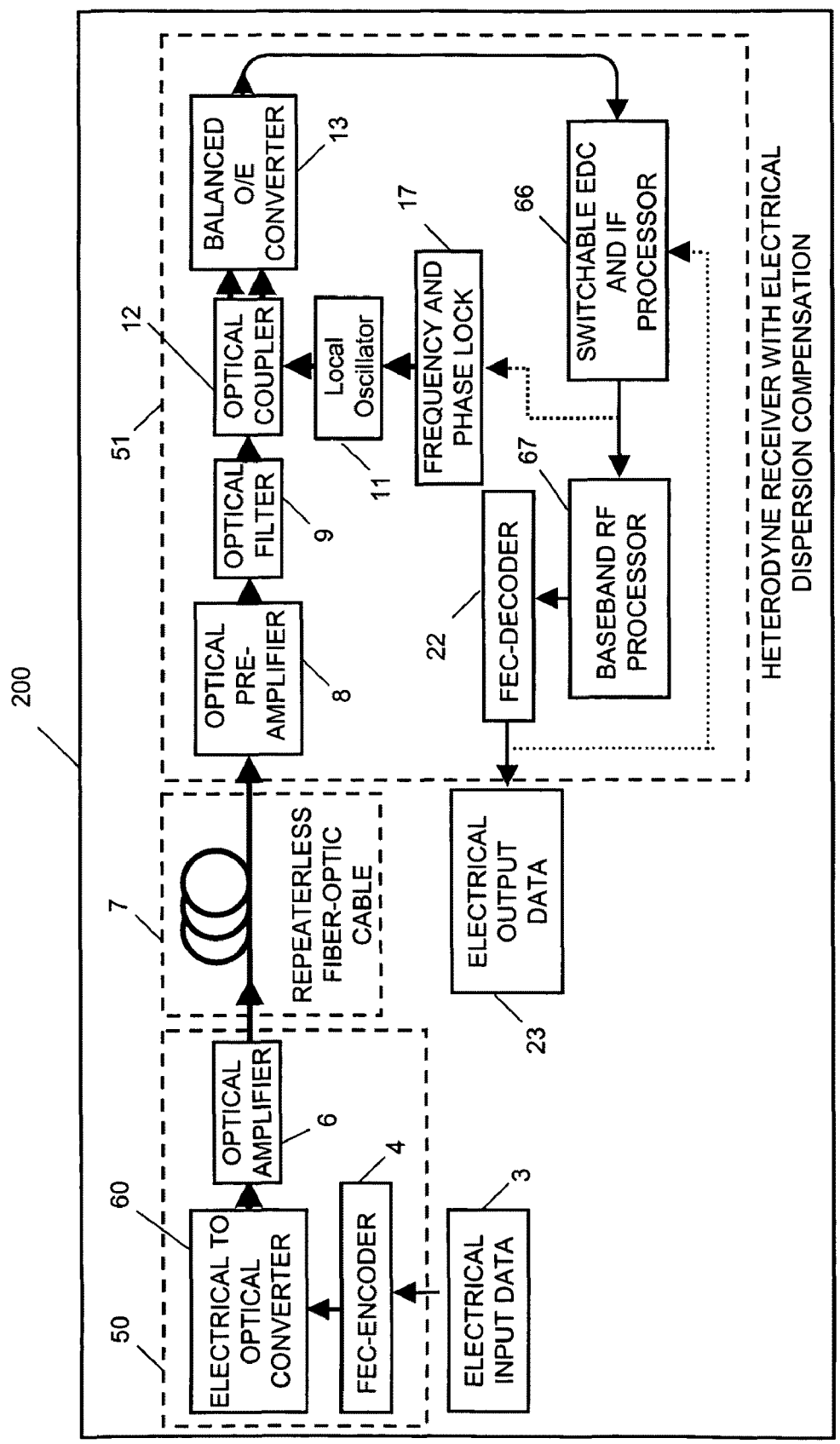
FIG. 2 shows a block-schematic diagram of a coherent transmission system for an embodiment of the invention.

A block-schematic diagram for a coherent transmission system 200 for a first embodiment of the invention is shown in FIG. 2, and includes an optical transmitter 50, and an optical receiver 51. Note, that for this first embodiment of the invention relative to the prior coherent receiver of FIG. 1, the former uses a heterodyne optical receiver with electrical dispersion compensator 51 in substitution of an optical dispersion compensating module 64. The Raman optical amplifiers 61, and 62, and optical amplifier 63, which are used in the prior system of FIG. 1 to compensate for the loss of optical dispersion compensating module 64, cause unwanted system noise, and are not used in the present invention.

The optical transmitter 50 of optical transmission system 200 includes an FEC (forward-error-correction encoder) 4 to receive an electrical input data signal 3, and encode it with redundant data for input to electrical-to-optical converter 60, for conversion into an optical signal. The optical signal is amplified by optical amplifier 6, and inputted into the input end of fiber-optic cable 7.

In the present optical transmission system 200 of FIG. 2, the optical amplifier 6 of optical transmitter 50 serves to generate a high power optical signal to transmit it over several hundred kilometers of low-loss positive dispersion transmission fiber-optic cable 7. The high-gain low noise figure optical preamplifier 8 of optical receiver 51 serves to amplify the received low power optical signal at the output end of the transmission fiber, and outputs the amplified signal to an optical filter 9 to filter out undesired optical signals. The output of the optical filter 9 is coupled through an optical coupler 12 to a balanced optical-to-electrical (O/E) converter 13 to convert the optical data signal into an electrical signal. The optical coupler 12 is driven by local oscillator (LO) 11. A frequency and phase lock loop 17, preferably controlled by a feedback signal from electronic dispersion compensation (EDC) 66, locks the frequency and phase of LO 11 to that of an electrical signal from O/E converter 13. The coherent optical receiver 51 provides high sensitivity to overcome the optical noise of the optical amplifier 6 of transmitter 50, and 8 of receiver 51. The coherent optical receiver 51 also includes a switchable electrical or electronic dispersion compensator (EDC) and IF processor 66, for receiving the electrical signal from converter 13, to compensate in the electrical domain for the chromatic dispersion in the signal caused by the transmission fiber of fiber-optic cable 7 in the optical domain. An electrical feedback signal is connected from the FEC or forward-error-correction decoder 22 to the electrical or electronic dispersion compensator 66, to provide a control signal to switch to the optimal electrical dispersion compensation. A baseband RF processor 67 receives the compensated electrical signal from EDC and IF processor 66 to convert the signal into baseband, for input to FEC decoder 22. FEC decoder 22 provides forward-error-correction to provide electrical output data signal 23.

With further reference to FIG. 2, for optimal transmission performance via the reduction of the number of optical in-line amplifiers, the following conditions must be maintained:
 1. Good receiver sensitivity;
 2. High robustness towards fiber nonlinear effects;
 3. Compensation of chromatic dispersion compensation without sacrificing transmission distance; and
 4. Correct setting of the optical launch power into the transmission fiber 7. Too much power causes penalties arising from the nonlinear transmission characteristics of the fiber-optic cable 7. Too low a level of power results in insufficient receiver signal power after the transmission fiber 7.

The repeaterless coherent optical transmission system 200 can approach the optimum performance under these conditions.

Figure 3:
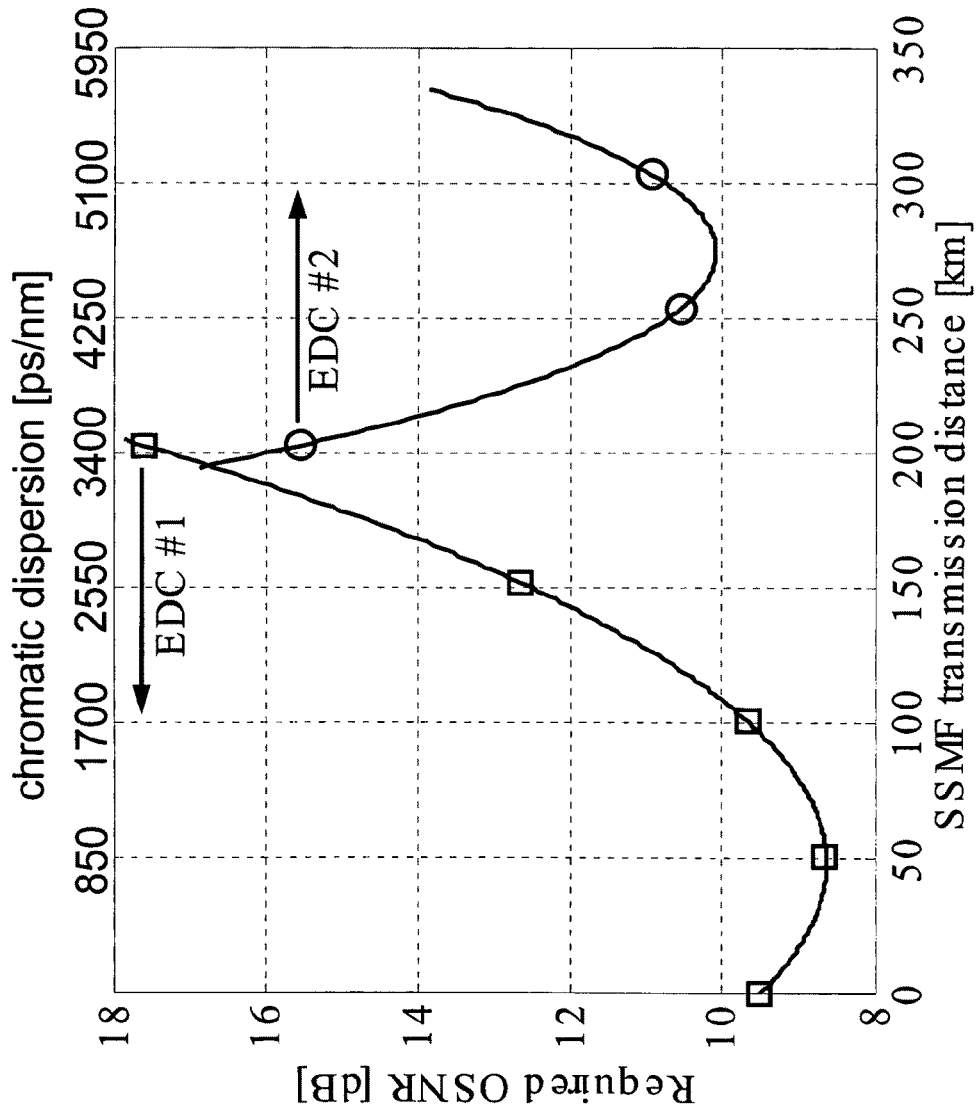
FIG. 3 shows curves of the required OSNR (0.1 nm resolution bandwidth, BER=1e-4) versus SSMF transmission distance for 10.7 Gb/s NRZ-DPSK (+15 dBm launch power) using a heterodyne receiver with electrical or electronic dispersion compensation, for one embodiment of the invention.

A way of demonstrating the performance of the optical transmission system 200 is to evaluate the required optical signal-to-noise ratio (OSNR) for a certain bit error ratio (BER) at the receiver 51 for different lengths of transmission fiber 7. A low required OSNR corresponds to a small received signal power at the input of the optical preamplifier 8, and demonstrates good system performance. For 0, 51, 101, 152, 203, 254, and 304 km of SSMF, respectively, the BER was recorded as a function of required OSNR (measured in 0.1 nm resolution bandwidth). The OSNR which is required for a BER of 1e-4 was determined and is plotted as a function of transmission distance as shown in FIG. 3. For distances of up to 175 km, an electrical dispersion compensator in processor 66 is used to compensate for 50 km of SSMF. After 175 km of SSMF an RF switch (not shown, but included in processor 66) triggered by a feedback signal from the FEC decoder 22 switches to an electronic dispersion compensator in processor 66 (not shown), which compensates for 275 km of SSMF 7. Optimized performance can be achieved either by shifting the optimum dispersion values or by having more than two compensators each for different lengths of fiber-optic cable 7.

The performance of the present coherent optical system 200 is demonstrated by evaluating the dispersion tolerance. The amount of residual dispersion that can be tolerated is an OSNR penalty of up to 2 dB with respect to the optimum value of zero. In FIG. 3 it can be seen that it is 2400 ps/nm (picoseconds per nanometer). These results demonstrate a high dispersion tolerance for the NRZ-DPSK (non-return to zero differential phase shift keying) modulation format in combination with the heterodyne receiver 51 of the present invention.

Figure 4:
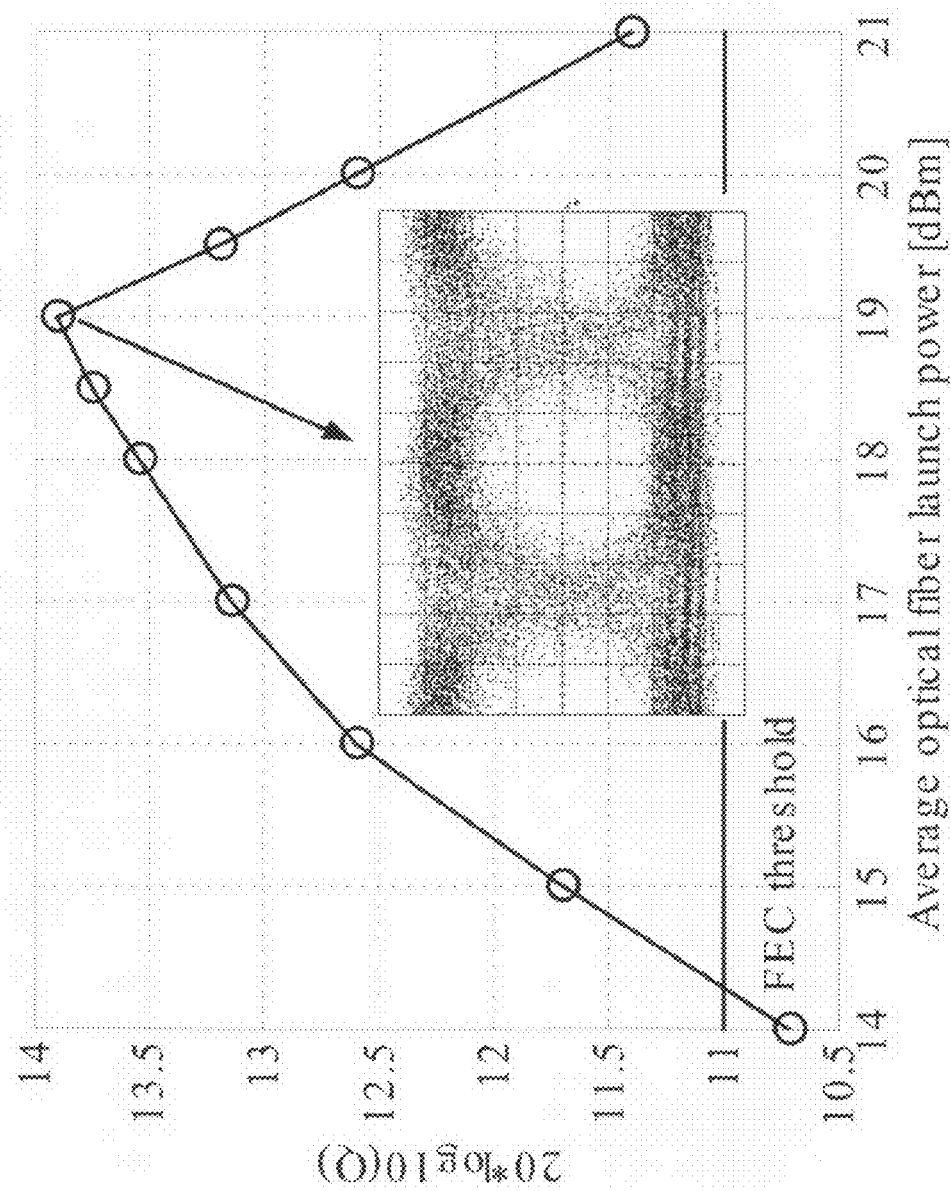
FIG. 4 shows a curve of Q-factor versus average optical fiber launch power after 304 km of SSMF for 10.7 Gb/s NRZ-DPSK using heterodyne detection with EDC, and an inset that shows a demodulated eye diagram for +19 dBm fiber launch power.

Another way of demonstrating the performance of the repeaterless optical transmission system 200 after the longest transmission distance of 304 km of SSMF is by evaluation of the Q-factor. The Q-factor is determined from the bit error ratio. A high Q-factor corresponds to a low bit error ratio. The measured Q-factor is given as a function of average optical launch power at the receiver as shown in FIG. 4. Between +14 to +16 dBm (decibels per milliwatt) of launch power, it can be seen that the Q-factor improves linearly with increasing launch powers as expected in a noise limited system. From +16 to +19 dBm the slope decreases since fiber nonlinear effects (mainly the self phase modulation) start to degrade the system performance. At +19 dBm launch power the best Q-factor is achieved before fiber nonlinearities decrease the system performance rapidly with increasing fiber launch power. Assuming a forward error correction or FEC threshold of 2e-4 (Q-factor=11 dB), a 3 dB system margin can be achieved for +19 dBm of launch power. A tolerance to launch power variation from +15 to +21 dBm is observed to guarantee a BER performance above the FEC threshold of 2e-4.

Yet another way of demonstrating the performance of the repeaterless coherent optical transmission system 200 is the evaluation of the so-called eye diagram after detection of a high-bit rate digital data stream. If the eye diagram has a wide vertical opening detection it can be anticipated that the signal incorporates low bit errors. An eye diagram detected with the coherent receiver 51 at 10 Gb/s after 304 km of repeaterless SSMF is shown in the subset of FIG. 4. The corresponding measurement of the bit error ratio is $1 \cdot 10^{-7}$ (one of a 10 million bits is in error). After the use of forward error correction this corresponds to error free transmission.

There are several differences between the prior art optical system 100 of FIG. 1, and the inventive repeaterless optical system 200 of FIG. 2, with the latter providing:

- Using only low-loss, large effective area, positive dispersion fiber-optic cable 7;
- Using no negative dispersion fiber or dispersion compensating fiber;
- Good receiver sensitivity through the use of the coherent optical receiver 51;
- Maintaining the optical phase distortions arising from chromatic dispersion of the transmission fiber-optic cable 7 after the optical-to-electrical conversion using coherent detection;
- Adaptive equalization of chromatic dispersion by an electronic compensator in processor 66, responsive to a feedback signal from the FEC decoder 22;
- Use of differential phase shift keyed signal from transmitter 50 for good receiver 51 sensitivity and high robustness towards fiber nonlinear effects.

Figure 5:
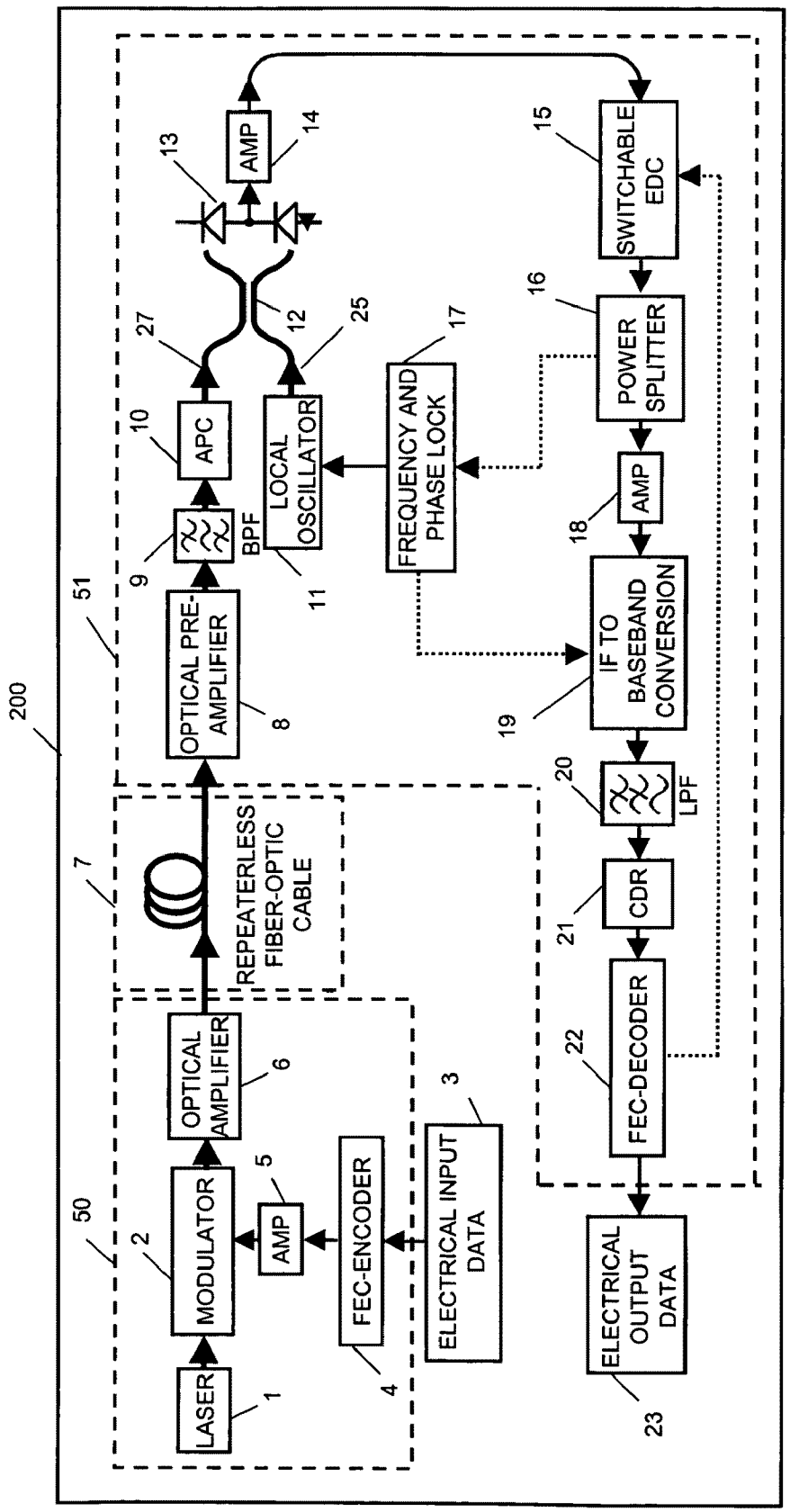
FIG. 5 shows a block-schematic diagram providing a more detailed view of the embodiment of the invention more generally shown in FIG. 2.

As previously mentioned, the block schematic diagram of FIG. 2 shows the major modules and submodules for a first embodiment of the invention for the repeaterless optical system 200. In FIG. 5, a detailed block-schematic diagram of the repeaterless optical system 200 shows greater details of the present design of the various modules that are more generally shown in FIG. 2. In FIG. 5, components or modules are configured in a preferred embodiment of the invention for providing an optical coherent repeaterless transmission system 200, but are not meant to be limiting. Those skilled in the art may recognize alternative design implementations for the modules of FIG. 2.

In FIG. 5, the coherent light output from the continuous wave tunable laser 1 is input to an electro-optical modulator 2. The electrical input data 3 provides the RF input signal to a forward-error-correction (FEC) encoder block 4. The RF amplifier 5 provides the acceptable voltage swing of the RF input to the electro-optical modulator 2. A high gain, high output power optical amplifier 6 amplifies the output of the electro-optical modulator 2. The output of the optical amplifier 6 is connected to the optical transmission fiber 7. A low noise figure, high gain optical preamplifier 8 amplifies the output of the transmission fiber 7. A bandwidth-appropriate optical signal bandpass filter 9 filters out out-of-band optical noise from the output of the optical preamplifier 8. An automatic optical signal polarization stabilizer (APC) 10 stabilizes the polarization state of the output of the signal optical bandpass filter 9, and provides the optical signal 27 through a polarization maintaining optical output fiber to the polarization maintaining 2×2 3 dB optical fiber coupler 12. The tunable laser local oscillator LO 11 also provides a large optical signal 25 through a polarization maintaining optical output fiber 25 to the optical input of the polarization maintaining 2×2 3 dB optical fiber coupler 12. A balanced photodiode detector (B-PD) 13, receives two optical outputs from optical fiber coupler 12, and converts them into an RF output signal. An RF amplifier 14 receives the RF output signal from the balanced O/E converter or photodiode detector 13, and passes the amplified RF output signal to a switchable electronic dispersion compensator (EDC) 15. The output of EDC 15 is fed to an RF power splitter 16. The optical frequency and phase locking module 17 receives one of the outputs of the splitter 16. The output of the optical frequency/phase locking module 17 controls the laser LO 11, for locking the frequency and phase of the latter to that of an electrical signal from O/E converter 13. The other output of the RF power splitter 16 serves as an input to an RF amplifier 18. The output of the RF amplifier 18 provides an input to the intermediate frequency (IF) to baseband conversion module 19, the output of which enters the lowpass filter 20. The intermediate-to-baseband conversion module 19 optionally receives a recovered IF signal from the frequency/phase locking module 17. The clock and data recovery (CDR) 21 receives the output of the lowpass filter 20. The output of the clock and data recovery 21 serves as an input to the FEC decoder 22. The FEC decoder 22 provides a feedback control signal to the switchable electronic dispersion compensator 15, for switching the latter to provide optimal dispersion compensation. The output of the FEC decoder 22 provides the electrical output data 23. The heterodyne function of the receiver 51 is provided by combining the optical signal 25 from local oscillator laser 11 with optical signal 27 from automatic polarization controller (APC) 10 in a polarization maintaining coupler 12 driving balanced detector 13.

With further reference to FIG. 5, as previously described, the continuous wave (CW) signal laser 1 is operating in the C band (1530-1565 nm) or L band (1570-1610 nm). The CW signal output from laser 1 is modulated by a LiNbO$_3$ Mach-Zehnder modulator 2 (MZM) in push-pull operation. The modulator 2 is biased in the in quadrature or in minimum to generate or output an on/off keying (OOK) signal or differential phase-shift keying (DPSK) signal, respectively. The electrical input data 3 provides the signal which is to be transmitted by optical transmitter 50 to optical receiver 51 over the repeaterless optical fiber span 7. The data rate of the input signal 3 can be 10 Gb/s but is not restricted to this. The input signal 3 is fed to the forward error correction encoder 4. The RF amplifier 5 is a high gain, high power broadband amplifier which provides the power or required voltage swing to the Mach-Zehnder modulator 2. A high gain, high output power Erbium-doped fiber amplifier (EDFA) 6 is capable of amplifying the output of the electro-optical modulator 2 to levels well above 100 mW. The output of the optical amplifier 6 is connected to the fiber-optic cable 7. This transmission fiber-optic cable 7 bridges distances over several hundred kilometers between the optical transmitter 50 and the optical receiver 51. The average loss of the fiber-optic cable 7 should be as low as possible and can approach 0.17 dB/km to minimize the link loss in the repeaterless system. The effective area of the transmission fiber-optic cable 7 should be large to minimize the effect of fiber nonlinearities. Possible fiber types for providing the transmission fiber or fiber-optic cable 7 are G.652 or G.654. The dispersion parameter of these types of fiber is 16 to 19 ps/nm/km (picoseconds per nanometer per kilometer). The output of the transmission fiber-optic cable 7 serves as an input to the optical heterodyne receiver 51 with electrical dispersion compensator 15. The receiver 51 includes a low noise figure (approaching 3.0 dB), high gain (40 dB) optical EDFA preamplifier 8 that amplifies the output of the transmission fiber or fiber-optic cable 7. A bandwidth-appropriate signal optical bandpass filter (BPF) 9 filters out out-of-band optical noise from the output of the optical preamplifier 8. An automatic optical signal polarization stabilizer (APC) 10 stabilizes the polarization state of the output of the signal optical bandpass filter 9, and provides the optical signal 27 through a polarization maintaining optical output fiber to the polarization maintaining 2×2 3 dB optical fiber coupler 12. The polarization stabilizer 10 operates with a single-mode fiber input. It is preferred that the output from the polarization stabilizer 10 is provided via a polarization-maintaining (PM) fiber, for insuring that the polarization state is maintained in the appropriate state of polarization (SOP). The widely tunable local oscillator laser LO 11 also provides a large optical signal 25 through a polarization maintaining optical output fiber to the optical input of the polarization maintaining 2×2 3 dB optical fiber coupler 12. For heterodyne applications, both the optical signal and LO laser 11 will have aligned SOPs. The optical output signals from the fiber coupler 12 are directly pigtailed into the balanced photodiodes (B-PD) 13 with identical path lengths. The responsivities of the B-PD 13 are matched and the common mode noise in the system is minimized for optimal receiver performance. The balanced photodetector 13 is in this example a DSC740 from Discovery Semiconductors (Ewing, N.J.), and has a bandwidth of 35 GHz and a responsivity of 0.6 A/W. The LO laser 11 generates a photocurrent of 10 mA per photodetector, in this example. The intermediate frequency (IF) of the coherently detected signal at the output of the B-PD 13 can be 20 GHz but is not restricted to this value. The B-PD 13 has enough bandwidth to receive the double side spectrum of the signal. The RF amplifier 14 is a well-isolated 50-ohm impedance low noise amplifier. The RF amplifier 14 has a bandwidth from 11 to 30 GHz but is not restricted to this value. This RF amplifier 14 supplies uniform gain with low group delay over the RF received passband, and provides sufficient non-compressed RF power to appropriately drive the subsequent switchable electrical dispersion compensator (EDC) 15. The switchable EDC 15 can be based on a microstrip-line built of a 27.5 mil thick substrate (dielectric constant=10.2, loss tangent=0.002735), for example. A 54 cm long microstrip-line EDC can provide 30.6 ps/GHz (equivalent to 3825 ps/nm) of chromatic dispersion compensation for frequencies ranging from 10 to 30 GHz. By putting together several microstrip-line EDC's of different lengths, and by and using RF switches (not shown) to switch between them, the EDC 15 can be made switchable. The switchable EDC 15 is not restricted to a microstrip-line based approach. Other switchable electronic dispersion compensators can also be used which, for example, are based on tapped-delay line filters. To set the right amount of dispersion compensation in the switchable EDC 15, as shown, the error signal from the FEC decoder 22 is used. No optical dispersion compensation is used. It is a purely electrically based EDC 15. The output of the switchable EDC 15 is fed to an RF power splitter 16. The RF power splitter 16 has to provide sufficient bandwidth and has to be matched to 50 Ohms. The optical frequency and phase locking module 17 receives one of the outputs of the splitter 16. Further details of the optical frequency and phase locking module 17 is given in Becker et al. U.S. Pat. No. 7,406,269. The output of the optical frequency/phase locking module 17 controls the laser LO 11. The other output of the RF splitter 16 serves as an input to an RF amplifier 18. The output of the RF amplifier 18 provides an input to the intermediate-to-baseband conversion module 19. Further details of the intermediate-to-baseband conversion module 19 are given in the aforesaid Becker et al. U.S. Pat. No. 7,406,269. The output of the intermediate-to-baseband conversion module 19 is inputted to the lowpass filter 20. The intermediate-to-baseband conversion module 19 optionally receives a recovered IF signal from the frequency/phase locking module 17. The clock and data recovery (CDR) module 21 receives the output of the lowpass filter 20. The output of the clock and data recovery module 21 serves as an input to the FEC decoder 22. The output of the FEC (forward error correction decoder) 22 provides the electrical output data 23.

The invention in all of its embodiments is envisioned to provide a small size, lightweight, low power consumption optical transmitter/receiver combination that can maintain these system submodules at optimized settings for best performance. The invention is envisioned to work for wavelength division multiplexed systems. The optical LO submodule 1 is widely tunable.

We have experimentally demonstrated a record repeaterless transmission of 10.7 Gb/s NRZ-DPSK over 304 km of SSMF provided by the present invention. Neither in-line amplifiers, Raman amplifiers, or optical dispersion compensation is used. Our unique system is obtained using heterodyne detection which preserves the phase distortions arising from chromatic dispersion so that electronic dispersion compensation can be used. The electronic equalizer or electrical dispersion compensator (EDC) 15 used in our prototype system is based on a microstrip line delay equalizer which compensates 3825 ps/nm of chromatic dispersion. The high receiver sensitivity and the high tolerance to fiber nonlinearities of DPSK allow overcoming a total link loss of 58 dB. A system margin of 3 dB is achieved assuming the presence of the simplest FEC (forward error correction).

The transmission penalty for 304 km is only 1.5 dB with respect to back-to-back operation. We have also confirmed that any distance between 0 and 300 km of SSMF can be bridged. For up to 200 km, no electronic dispersion compensator is necessary. Distances from 200 to 300 km are bridged with one fixed dispersion compensator. Our system can be improved by using optimized compensation values. Automatically switching between compensation values will give the highest flexibility. Link design for 10 Gb/s over deployed SSMF, anywhere from 0 to over 300 km, can be envisioned without using an optical dispersion compensation, in-line amplification, or Raman amplification.

The following Table 1 provides identification of components used in various embodiments of the invention in an experimental engineering prototype.

TABLE 1

| Component | Manufacturer | Part Number | Operating Parameters |
|---|---|---|---|
| 10 | General Photonics | POS-103-OEM | Input Power: −40 to +10 dBm |
| 12 | Canadian Instrumentation | 954P | 50/50 fixed ratio |
| 13 | Discovery Semiconductors | DSC740 | 35 GHz Bandwidth |
| 14 | Spacek | SL1916-15-4 | 11-27 GHz Bandwidth, 15 dB RF gain, 3.5 dB noise figure |
| 18 | Miteq | AFS44-00102650-42-10P-44 | 0.1-26.5 GHz Bandwidth, 35 dB RF gain, 4.2 dB noise figure |
| Part of 19 | Marki Microwave | M9-0750 | 7-50 GHz RF/LO; DC-10 GHz IF |
| 20 | Picosecond Pulselabs | 5915-110-10.00 | DC-10 GHz Bandwidth |
| 1/11 | JDSU | CQF 935-908 | 63 mW, −160 dB/Hz RIN, <2 MHz linewidth |
| Part of 15 | Discovery Semiconductors | EDC1 | 10-30 GHz Bandwidth, 3825 ps/nm dispersion compensation |
| 17 | Discovery Semiconductors | FPL1 | 2 nm tuning range; 60 MHz frequency resolution |
| 2 | Covega | Mach-10 002 | Zero chirp Mach-Zehnder modulator 12 GHz Bandwidth |

TABLE 1-continued

| Component | Manufacturer | Part Number | Operating Parameters |
|---|---|---|---|
| 5 | Picosecond Pulselabs | 5865 | 12.5 Gb/s modulator driver amplifier |
| 7 | OFS | G.652 | Standard single-mode fiber 304 km |

The foregoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed is:

1. A repeaterless differential phase-shift keying (DPSK) and/or on-off keying (OOK) transmission system, comprising:
    a repeaterless fiber optic cable having an input end and an output end;
    an optical transmitter including means for converting an electrical data input signal into an optical data signal representation thereof, for outputting into the input end of said fiber-optic cable;
    a coherent optical receiver for receiving said optical data signal from the output end of said fiber-optic cable, said optical receiver including means for converting said optical data signal into an electrical data output signal, comprising:
        heterodyne detection means receptive of the optical data signal for preserving phase distortions in the signal produced by chromatic dispersion during passage through the fiber-optic cable;
        an optical-to-electrical (O/E) converter receptive of an output optical data signal from said heterodyne means, for converting the signal into an electrical signal;
        electronic dispersion compensation (EDC) means for receiving the electrical data signal from said O/E converter to compensate for the chromatic dispersion in said signal;
    means for processing a compensated electrical output signal from said compensation means to provide an electrical data output signal; and
    wherein said electronic dispersion compensation means includes:
        a switchable electronic dispersion compensator (EDC) and intermediate frequency (IF) processor, for receiving said electrical signal from said O/E converter, to process the signal and provide a chromatic dispersion compensated (CDC) output signal; and
        a baseband RF processor for receiving said CDC output signal, and converting the signal into baseband.

2. The transmission system of claim 1, wherein said means for converting an electrical data input signal into an optical data signal representation thereof, include:
    a forward-error-correction encoder for receiving said electrical data input signal, to process the signal to provide a redundant data encoded electrical data signal;
    an electrical-to-optical converter for receiving and converting the redundant data, encoded electrical data signal into an optical data signal; and
    an optical amplifier for amplifying said optical data signal, for connection to the input end of said fiber-optic cable.

3. The transmission system of claim 1, wherein said optical transmitter further includes a forward-error-correction (FEC) encoder for redundantly encoding said input signal before its conversion into an optical data signal.

4. The transmission system of claim 1, wherein said heterodyne detection means include:
    a laser local oscillator for providing an optical reference signal; and
    an optical coupler for receiving and mixing together said optical data signal and said optical reference signal, for outputting said output optical data signal to said O/E converter.

5. The transmission system of claim 4, wherein said heterodyne detection means further includes a frequency and phase lock loop, for locking the frequency and phase of said laser local oscillator to that of the electrical signal from said O/E converter.

6. The transmission system of Claim 1, wherein said heterodyne detection means includes:
    a laser local oscillator for providing an optical reference signal;
    an optical coupler for receiving and mixing together said optical data signal and said optical reference signal, for outputting said output optical data signal to said O/E converter; and
    a frequency and phase lock loop, for locking the frequency and phase of said laser local oscillator to that of the electrical signal from said O/E converter.

7. The transmission system of claim 6, wherein said frequency and phase lock loop is receptive of said CDC output signal, for controlling the laser local oscillator to lock the optical reference signal frequency and phase to that of said CDC output.

8. The transmission system of claim 1, further including:
    said optical transmitter further including a forward-error-correction correction (FEC) encoder for redundantly encoding said input signal before its conversion into an optical data signal; and
    an FEC decoder for decoding said baseband signal into said electrical data output signal.

9. The transmission system of claim 1, further including:
    said heterodyne detection means including:
        a laser local oscillator for providing an optical reference signal; and
        an optical coupler for receiving and mixing together said optical data signal and said optical reference signal, for outputting said output optical data signal to said O/E converter;
        said optical transmitter further including a forward-error-correction correction (FEC) encoder for redundantly encoding said input signal before its conversion into an optical data signal; and
        an FEC decoder for decoding said baseband signal into said electrical data output signal.

10. The transmission system of claim 1, further including:
    said optical transmitter further including a forward-error-correction correction (FEC) encoder for redundantly encoding said input signal before its conversion into an optical data signal;
    a laser local oscillator for providing an optical reference signal; and
    an optical coupler for receiving and mixing together said optical data signal and said optical reference signal, for outputting said output optical data signal to said O/E converter.

11. The transmission system of claim 1, further including:
said optical transmitter further including a forward-error-correction correction (FEC) encoder for redundantly encoding said input signal before its conversion into an optical data signal; and
an FEC decoder for decoding said baseband signal into said electrical data output signal;
whereby a feedback signal is connected from said FEC decoder to said switchable EDC and IF processor, for switching to the right amount of electronic dispersion compensation.

12. The transmitter system of claim 4, wherein said optical receiver further including:
an optical preamplifier for receiving and amplifying said optical data signal from said fiber optic cable; and
an optical filter for receiving and filtering the amplified optical data signal, for connection to said heterodyne detection means.

13. The transmission system of claim 12, wherein said optical filter is an optical bandpass filter, and said heterodyne detection means includes:
an automatic optical signal polarization stabilizer (APC) receptive of the filtered optical data signal from said optical filter for stabilizing the polarization state thereof;
said optical coupler consisting of a 2×2 polarization maintaining optical fiber coupler having a first input for receiving the stabilized optical data signal, a second input, a first output, and a second output; and
a laser local oscillator for connecting an optical reference signal to the second input of said optical coupler, the first and second outputs of said optical coupler being connected to first and second inputs of said O/E converter, the latter being a balanced O/E detector.

14. The transmission system of claim 13, wherein said heterodyne detection means further includes:
a frequency and phase lock loop for providing a control signal to said laser local oscillator, to lock the frequency and phase of said laser local oscillator to that of the electrical signal output from said O/E converter.

15. The transmission system of claim 14, further including:
a power splitter receptive of the compensated electrical output signal from said EDC means, said power splitter outputting a reference signal to said frequency and phase lock loop, and an electrical output signal to said processing means;
said optical transmitter further including a forward-error-correction (FEC) encoder for redundantly encoding said electrical input data signal before its conversion into an optical signal; and
said processing means includes:
an IF to baseband converter for receiving the electrical output signal from said power splitter, and converting the signal to baseband;
a low pass filter for receiving and filtering a baseband converted signal from said IF to baseband converter;
a clock and data recovery (CDR) module for receiving said low-pass filtered signal; and
an FEC decoder for receiving an output signal from said CDR, and converting the signal into an electrical data output signal.

16. The transmission system of claim 15, further including:
a feedback signal from said frequency and phase lock loop to said IF to baseband converter, for providing a recovered intermediate frequency signal to the said IF to baseband converter; and
a feedback signal from said FEC decoder to said EDC means for switching to the right amount of electrical dispersion compensation.

17. The transmission system of claim 1, further including:
said heterodyne detection means including:
a laser local oscillator for providing an optical reference signal; and
an optical coupler for receiving and mixing together said optical data signal and said optical reference signal, for outputting said output optical data signal to said O/E converter; and
a frequency and phase lock loop, for locking the frequency and phase of said laser local oscillator to that of the electrical signal from said O/E converter; and
said means for converting an electrical data input signal into an optical data signal representation thereof includes:
a forward-error-correction encoder for receiving said electrical data input signal, to process the signal to provide a redundant data encoded electrical data signal;
an electrical-to-optical converter for receiving and converting the redundant data, encoded electrical data signal into an optical data signal; and
an optical amplifier for amplifying said optical data signal, for connection to the input end of said fiber-optic cable;
a first feedback signal being connected from aid FEC decoder to said switchable EPC and IF processor; and
a second feedback signal being said CDC output signal connected to said laser local oscillator.

18. A repeaterless differential phase-shift keying (DPSK) and/or on-off keying (OOK) transmission system, comprising:
a repeaterless fiber optic cable having an input end and an output end;
an optical transmitter including means for converting an electrical data input signal into an optical data signal representation thereof, for outputting into the input end of said fiber-optic cable;
a coherent optical receiver for receiving said optical data signal from the output end of said fiber-optic cable, said optical receiver including means for converting said optical data signal into an electrical data output signal, comprising:
heterodyne detection means receptive of the optical data signal for preserving phase distortions in the signal produced by chromatic dispersion during passage through the fiber-optic cable;
an optical-to-electrical (O/E) converter receptive of an output optical data signal from said heterodyne means, for converting the signal into an electrical signal; and
electronic dispersion compensation (EDC) means for receiving the electrical data signal from said O/E converter to compensate for the chromatic dispersion in said signal;
means for processing a compensated electrical output signal from said compensation means to provide an electrical data output signal;
wherein said heterodyne detection means includes:
a laser local oscillator for providing an optical reference signal; and
an optical coupler for receiving and mixing together said optical data signal and said optical reference signal, for outputting said output optical data signal to said O/E converter;

a frequency and phase lock loop, for locking the frequency and phase of said laser local oscillator to that of the electrical signal from said O/E converter;
wherein said electronic dispersion compensation means includes:
a switchable electronic dispersion compensator (EDC) and intermediate frequency (IF) processor, for receiving said electrical signal from said O/E converter, to process the signal and provide a chromatic dispersion compensated (CDC) output signal; and
a baseband RF processor for receiving said CDC output signal and converting the signal, and converting the signal into baseband;
said means for converting an electrical data input signal into an optical data signal representation thereof includes:
a forward-error-correction encoder for receiving said electrical data input signal, to process the signal to provide a redundant data encoded electrical data signal;
an electrical-to-optical converter for receiving and converting the redundant data, encoded electrical data signal into an optical data signal; and
an optical amplifier for amplifying said optical data signal, for connection to the input end of said fiber-optic cable;
a first feedback signal being connected from aid FEC decoder to said switchable EPC and IF processor; and
a second feedback signal being said CDC output signal connected to said laser local oscillator.

19. A repeaterless differential phase-shift keying (DPSK) and/or on-off keying (OOK) transmission system, comprising:
a repeaterless fiber optic cable having an input end and an output end;
an optical transmitter including means for converting an electrical data input signal into an optical data signal representation thereof, for outputting into the input end of said fiber-optic cable;
a coherent optical receiver for receiving said optical data signal from the output end of said fiber-optic cable, said optical receiver including means for converting said optical data signal into an electrical data output signal, comprising:
heterodyne detection means receptive of the optical data signal for preserving phase distortions in the signal produced by chromatic dispersion during passage through the fiber-optic cable;
an optical-to-electrical (O/E) converter receptive of an output optical data signal from said heterodyne means, for converting the signal into an electrical signal; and
electronic dispersion compensation (EDC) means for receiving the electrical data signal from said O/E converter to compensate for the chromatic dispersion in said signal;
means for processing a compensated electrical output signal from said compensation means to provide an electrical data output signal;
said optical transmitter further including a forward-error-correction correction (FEC) encoder for redundantly encoding said input signal before its conversion into an optical data signal; and
said electronic dispersion compensation means including:
a switchable electronic dispersion compensator (EDC) and intermediate frequency (IF) processor, for receiving said electrical signal from said O/E converter, to process the signal and provide a chromatic dispersion compensated (CDC) output signal; and
a baseband RF processor for receiving said CDC output signal, and converting the signal into baseband;
an FEC decoder for decoding said baseband signal into said electrical data output signal.

20. A repeaterless differential phase-shift keying (DPSK) and/or on-off keying (OOK) transmission system, comprising:
a repeaterless fiber optic cable having an input end and an output end;
an optical transmitter including means for converting an electrical data input signal into an optical data signal representation thereof, for outputting into the input end of said fiber-optic cable;
a coherent optical receiver for receiving said optical data signal from the output end of said fiber-optic cable, said optical receiver including means for converting said optical data signal into an electrical data output signal, comprising:
heterodyne detection means receptive of the optical data signal for preserving phase distortions in the signal produced by chromatic dispersion during passage through the fiber-optic cable;
an optical-to-electrical (O/E) converter receptive of an output optical data signal from said heterodyne means, for converting the signal into an electrical signal; and
electronic dispersion compensation (EDC) means for receiving the electrical data signal from said O/E converter to compensate for the chromatic dispersion in said signal;
means for processing a compensated electrical output signal from said compensation means to provide an electrical data output signal; and
said heterodyne detection means including:
a laser local oscillator for providing an optical reference signal; and
an optical coupler for receiving and mixing together said optical data signal and said optical reference signal, for outputting said output optical data signal to said O/E converter;
said optical transmitter further including a forward-error-correction correction (FEC) encoder for redundantly encoding said input signal before its conversion into an optical data signal; and
said electronic dispersion compensation means including:
a switchable electronic dispersion compensator (EDC) and intermediate frequency (IF) processor, for receiving said electrical signal from said O/E converter, to process the signal and provide a chromatic dispersion compensated (CDC) output signal; and
a baseband RF processor for receiving said CDC output signal, and converting the signal into baseband;
an FEC decoder for decoding said baseband signal into said electrical data output signal.

21. A repeaterless differential phase-shift keying (DPSK) and/or on-off keying (OOK) transmission system, comprising:
a repeaterless fiber optic cable having an input end and an output end;
an optical transmitter including means for converting an electrical data input signal into an optical data signal representation thereof, for outputting into the input end of said fiber-optic cable;
a coherent optical receiver for receiving said optical data signal from the output end of said fiber-optic cable, said optical receiver including means for converting said optical data signal into an electrical data output signal, comprising:

heterodyne detection means receptive of the optical data signal for preserving phase distortions in the signal produced by chromatic dispersion during passage through the fiber-optic cable;

an optical-to-electrical (O/E) converter receptive of an output optical data signal from said heterodyne means, for converting the signal into an electrical signal; and electronic dispersion compensation (EDC) means for receiving the electrical data signal from said O/E converter to compensate for the chromatic dispersion in said signal;

means for processing a compensated electrical output signal from said compensation means to provide an electrical data output signal;

said optical transmitter further including a forward-error-correction correction (FEC) encoder for redundantly encoding said input signal before its conversion into an optical data signal; and said electronic dispersion compensation means including:
a switchable electronic dispersion compensator (EDC) and intermediate frequency (IF) processor, for receiving said electrical signal from O/E converter, to process the signal and provide a chromatic dispersion compensated (CDC) output signal; and
a baseband RF processor for receiving said CDC output signal, and converting the signal into baseband;

an FEC decoder for decoding said baseband signal into said electrical data output signal;

whereby a feedback signal is connected from said FEC decoder to said switchable EDC and IF processor, for switching to the right amount of electronic dispersion compensation.

\* \* \* \* \*